: 3,667,923
PREPARATION OF LITHIUM, SODIUM AND QUATERNARY AMMONIUM CYANOBORO-HYDRIDES
Robert C. Wade, Ipswich, Mass., assignor to Ventron Corporation, Beverly, Mass.
No Drawing. Filed June 16, 1969, Ser. No. 833,722
Int. Cl. C01c 3/08; C01b 35/00
U.S. Cl. 23—358      4 Claims

ABSTRACT OF THE DISCLOSURE

The invention relates to the preparation of lithium, sodium and quaternary ammonium cyanoborohydrides. These compounds are prepared by mixing substantially anhydrous hydrogen cyanide with a substantially anhydrous lithium or sodium or quaternary ammonium borohydride at a temperature between 0° C. and 100° C. in a substantially anhydrous solvent, such as tetrahydrofuran, glyme, diglyme, triglyme or dimethyl formamide or mixtures of these at atmospheric pressure. If desired, to avoid loss of hydrogen cyanide, a pressure of from about 1 to 5 pounds per square inch may be used. Preferably, the preparation is carried out in two stages (1) initially at a temperature between about 10° to about 35° C. until substantially all hydrogen has ceased to be evolved and (2) then at a temperature between about 35° C. and the boiling point of the solvent until all the intermediate products have been converted to the desired cyanoborohydride.

---

This invention relates to the preparation of lithium, sodium and quaternary ammonium cyanoborohydrides.

The synthesis of lithium cyanoborohydride was reported by G. Wittig and P. Raff in Annalan 573, pages 202, 209 (1951). They reacted an excess of hydrocyanic acid with lithium borohydride in diethyl ether at 100° C. and 500 p.s.i. pressure.

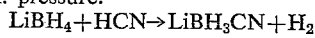

They found that this product reacted with dioxane to form a bis-dioxanate, $LiBH_3CN \cdot 2C_4H_8O_2$. Upon vacuum drying this product one mole of dioxane is removed to give, $LiBH_3CN \cdot C_4H_8O_2$.

As far as I am aware, there is no publication describing the preparation of the other alkali metal or quaternary ammonium cyanoborohydrides. These probably could not be prepared by the Wittig et al. method because of the insolubility of $NaBH_4$ and $KBH_4$ in ether. Neither are there any references in the literature of the products $NaBH_3CN$, $KBH_3CN$ or $R_4NBH_3CN$ or their ether complexes that I am aware of.

The Jackson and Miller United States Pat. No. 2,992,885 describes processes and products which are adducts of diborane and metal salts, such as NaCN as indicated by the formula:

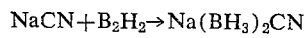

The dioxanates are also described.

The United States patent to Miller, No. 3,018,160, describes compounds represented by the formula:

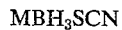

such as $NaBH_3SCN$ and the glycol dimethyl etherate adduct of $LiBH_3SCN$ and the glycol dimethyl etherate adduct of $LiBH_3SCN$. These products are made by the addition of diborane to the metal thiocyanate in tetrahydrofuran, glyme, dimethyl ether, etc.

The products of these two patents are distinctly different from those obtained by the present invention.

I have discovered that anhydrous hydrogen cyanide reacts readily with a quaternary ammonium borohydride and with the borohydrides of lithium and sodium at atmospheric pressure in solvents for the borohydride, such as glyme, diglyme, triglyme, tetrahydrofuran and dimethyl formamide, or mixtures of these at a temperatures between 0° and the boiling point of the solvent to form the corresponding cyanoborohydride. The preferred solvents are tetrahydrofuran and glyme because of their convenient boiling points.

Potassium borohydride does not react readily with hydrogen cyanide in tetrahydrofuran or glyme presumably because of its lack of solubility in these solvents. However, it reacts with hydrogen cyanide in dimethyl formamide similarly to the other borohydrides mentioned above.

The reaction of the process of the invention appears to take place in two stages. Thus, if the reaction mixture is initially maintained between about 10° and about 35° C. until hydrogen ceases to be evolved, an intermediate product is formed which is hydrolyzed by water or weak aqueous acid solutions. In the second stage, the reaction mixture is heated at least to between 35° C. and the boiling point of the solvent until the intermediate product has been converted to the desired cyanoborohydride corresponding to the initial borohydride reactant selected. The final product is stable in water and aqueous acids to a pH of about 3.

If temperatures higher than about 35° C. are used in the first stage of the reaction, some hydrogen cyanide is lost by evaporation and is swept out of the reaction zone by the evolving hydrogen. Loss of hydrogen cyanide can be overcome by applying a slight pressure of about 1 to 5 pounds per square inch to the system, but this is not necessary when operating in the preferred temperature range in the first stage of the reaction. Since all the hydrogen cyanide has been reacted during the first stage, none can be lost during the second stage which is carried out between 35° C. and the B.P. of the solvent.

All of the starting reactants and solvents should be as anhydrous as possible because water, in the presence of even weak acid, such as hydrocyanic acid, can cause hydrolysis of the starting borohydride and intermediate products. The final product, cyanoborohydride, does not hydrolyze under these conditions however.

The products of these reactions all are more soluble in the reaction solvent than the starting borohydride and are soluble in water. Furthermore, they are highly solvated. These solutions are useful for many applications, such as organic reductions. Excess solvents can be removed by solvent evaporation to yield solid products containing from almost none of the solvent to up to 1 mole of the solvent per mole of the cyanoborohydride. The lithium and sodium cyanoborohydrides may be precipitated from the starting solvents by the addition of dioxane to form white crystalline solid precipitates. When vacuum dried these crystals contain 1 to 2 moles of dioxane per mole of cyanoborohydride depending on the time, temperature and vacuum under which drying takes place.

Any quarternary ammonium borohydride may be used in the practice of the invention. By way of illustration I may mention tetramethyl, tetraethyl, tetrapropyl, tetraisopropyl, tetrabutyl, butyltrimethyl, phenyl trimethyl, benzyltrimethyl, (2-cyclohexyl)-tri-methyl, allyltrimethyl, (2-chloroethyl) trimethyl, 2-hydroxybutyl-trimethyl, (2-ethoxypropyl trimethyl, alpha-amino-p-tolyltrimethyl, (3-cyanopropyl trimethyl, (2-carboxyethyl) trimethyl, amyl-dimethyl-phenyl, Cetyl trimethyl and tricapryl methyl ammonium borohydrides.

The invention is illustrated further by the following specific examples.

EXAMPLE I

A 1 liter flask was set up with a dropping funnel, thermometer and reflux condenser. A gas line led from the top of the reflux condenser to a caustic scrubber and then to a wet test meter. Stirring was accomplished by a magnetic stirring device. Temperature of the reaction flask was controlled by a water bath.

The flask was charged with 225 ml. of tetrahydrofuran and 33.8 g. $NaBH_4$ (0.89 mole). 24 grams of liquid HCN (0.89 mole) cooled to 10° C. was placed in the dropping funnel. This was added dropwise to the $NaBH_4$-tetrahydrofuran slurry over the course of about 1 hour and 10 minutes. The reaction immediately began to evolve hydrogen and the temperature increased from 19° to 23° C. The reaction temperature was controlled from 20°–27° C. by adding ice to the water bath. A total of 20.5 liters of $H_2$ was evolved. Theoretically, there should be 19.9 liters evolved. Only 0.37 gram of NaCN was found in the caustic trap. When the reaction was complete, THF was evaporated at 62° C. under a vacuum of 1–5 mm. During this drying sequence, rearrangement of the initial reaction products to the sodium cyanoborohydride took place. Analysis of this product showed hydridic hydrogen=4.0%; theoretically, =4.8%. This corresponds to about 83.5% pure $NaBH_3CN$. This product was very soluble in water. Aqueous solutions of this product are reducing agents for organic carbonyl compounds and metallic salts such as copper, nickel, cobalt, silver, etc. These solutions are stable to a pH of about 3. In contrast, sodium borohydride decomposes at a pH below about 9.

EXAMPLE II

Using the same procedure and equipment described in Example I, 0.5 mole of $NaBH_4$ dissolved and dispersed in 250 g. of dimethoxy ethane (glyme) was reacted with 0.5 mole of HCN which was dissolved in dimethoxy ethane (glyme) to give a 20% solution. 10.2 liters of $H_2$ were evolved. The reaction temperature was maintained between 18 and 27° C. When the initial reaction was complete, about 1 liter of dioxane was added to the $NaBH_3CN$ dimethoxy ethane solution. A white precipitate was obtained and filtered off. This is a dioxane complex of $NaBH_3CN$. The product was washed several times with dioxane and then dried in an air oven at 100° C. for 15 minutes. 61 grams of light tan solid product was obtained.

Analysis. — H=1.3, CN=11.6%, B=5.67%, C=40.6%, H=7.4%.

This corresponds very closely to the product $$NaBH_3CN \cdot 1.6(C_4H_8O_2)$$

or 1.6 moles of dioxane per mole of $NaBH_3CN$. The product was very soluble in water.

Equivalent results were obtained where the reaction was carried out in the dimethyl ether of diethylene glycol (diglyme) and triglyme.

EXAMPLE III

The previously described reaction apparatus was charged with 110 grams of dimethyl formamide and 3.8 g. (0.1 mole) $NaBH_4$; most of the $NaBH_4$ dissolved. Then 2.7 g. (0.1 mole) of HCN, dissolved in dimethyl formamide to give a 20% solution, was added dropwise to the $NaBH_4$ solution. An immediate reaction occurred, hydrogen was evolved, and the temperature rose from 29–39° C. during the course of the reaction. A total of 2.5 liters of hydrogen was evolved; theoretically, 2.2 liters. Traces of moisture in the dimethyl formamide were found to be responsible for the excess hydrogen evolved in this experiment. The dark brown dimethyl formamide solution of this product was dissolved in water and used to reduce aqueous solutions of nickel salts to produce mirror-like plating on glass surfaces.

EXAMPLE IV 2.2 grams of $LiBH_4$ (0.1 mole) was dissolved and dispersed in 100 ml. tetrahydrofuran. 2.7 g. (0.1 mole) HCN was added dropwise over a period of 10 minutes to this mixture. Temperature of reaction was 23–28° C. 2.38 liters of hydrogen were evolved; theoretically, 2.2 liters. The product was isolated by evaporating off most of the tetrahydrofuran, then adding dioxane to give a white crystalline precipitate, which was dried for 30 minutes at 100° C. This product was found to be primarily $$LiBH_3CN \cdot 2C_4H_8O_2$$

the bisdioxanate complex of $LiBH_3CN$.

EXAMPLE V 17.4 g. (0.12 mole) of tetraethyl ammonium borohydride was dispersed in 100 ml. tetrahydrofuran. To this mixture was added 0.12 mole (3.14 g.) of liquid HCN dropwise over a period of 20 minutes. Temperature of the reaction was 23–28° C. A total of 2.8 liters of hydrogen were evolved during this slow reaction over a period of 2.5 hours during which time the temperature was increased to 40° C. Theoretically, $H_2$ evolution is 2.7 liters. This product was isolated by evaporating off the tetrahydrofuran at 60–65° C. and under a vacuum of 1–5 mm. Hg. Likewise, the cyanoborohydrides were prepared from cetyl trimethyl ammonium borohydride and tricaprylmethyl ammonium borohydride in tetrahydrofuran. Tetramethyl ammonium cyanoborohydride was prepared from tetramethyl ammonium borohydride in diglyme.

I claim:

1. The process for preparing a cyanoborohydride having the formula $XBH_3CN$ where X is selected from the group consisting of sodium, lithium and a quaternary ammonium radical and which comprises heating substantially anhydrous hydrogen cyanide with a substantially anhydrous borohydride selected from the group consisting of a quaternary ammonium borohydride, lithium borohydride, and sodium borohydride at a temperature between about 10° C. and about 35° C. in a substantially anhydrous solvent selected from the group consisting of tetrahydrofuran, glyme, diglyme, triglyme and dimethylformamide and mixtures thereof until substantially all hydrogen has ceased to be evolved, then heating the reaction mixture to between 35° C. and the boiling point of the solvent until all intermediate products have been converted to the desired cyanoborohydride corresponding to the selected borohydride.

2. The process as claimed by claim 1 in which the selected borohydride is lithium borohydride.

3. The process as claimed by claim 1 in which the selected borohydride is sodium borohydride.

4. The process as claimed by claim 1 in which the selected borohydride is a quaternary ammonium borohydride.

References Cited

UNITED STATES PATENTS 2,992,885   7/1961   Jackson et al. _____ 23—358

OTHER REFERENCES

Adams et al.: "Boron, Metallo-Boron Compounds and Boranes," 1964, pp. 458–460.

Gaylord: "Reduction With Complex Metal Hydrides," 1956, pp. 1012–1013.

Wittig et al.: "Annalen," vol. 573, pp. 202, 209 (1951).

Adams et al.: "Boron, Metallo-Boron Compounds and Boranes," 1964, pp. 385–390.

MILTON WEISSMAN, Primary Examiner

U.S. Cl. X.R.

260—567.6; 23—359